No. 884,590. PATENTED APR. 14, 1908.
C. F. JONES.
MECHANICAL MOVEMENT.
APPLICATION FILED OCT. 20, 1906.
2 SHEETS—SHEET 1.
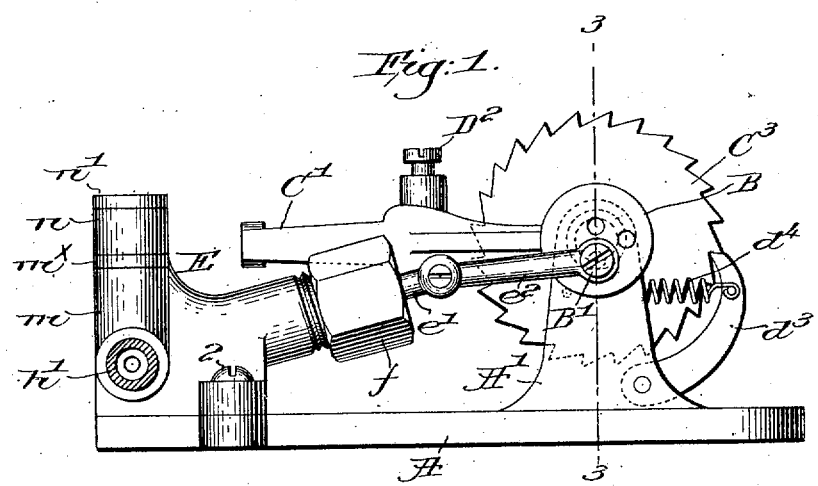
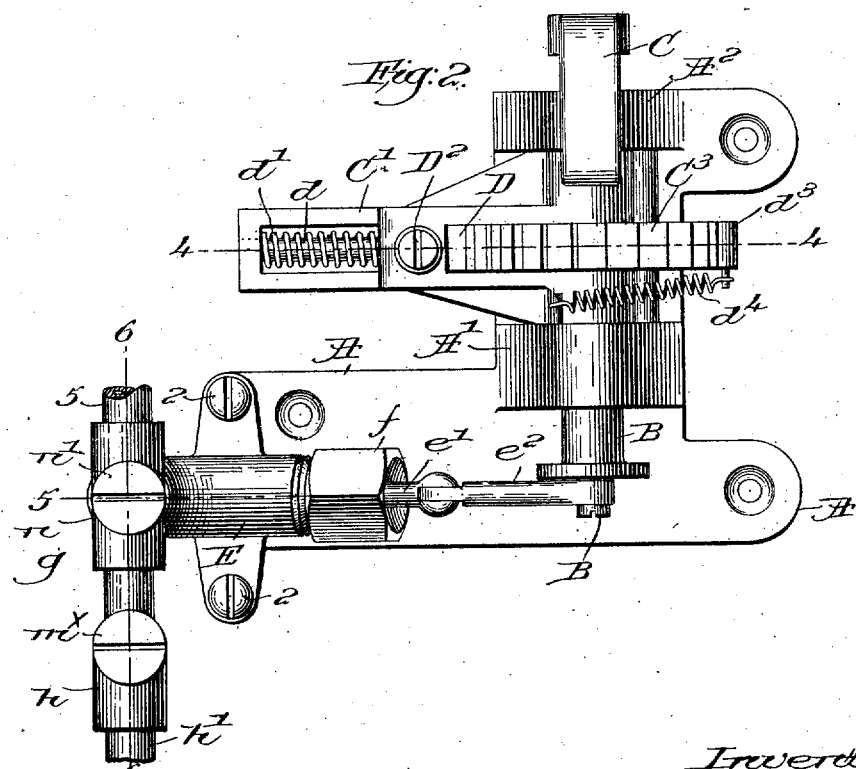
Witnesses
Edward G. Allen
Joseph M. Ward
Inventor
Charles F. Jones
by Crosby & Gregory
Attys

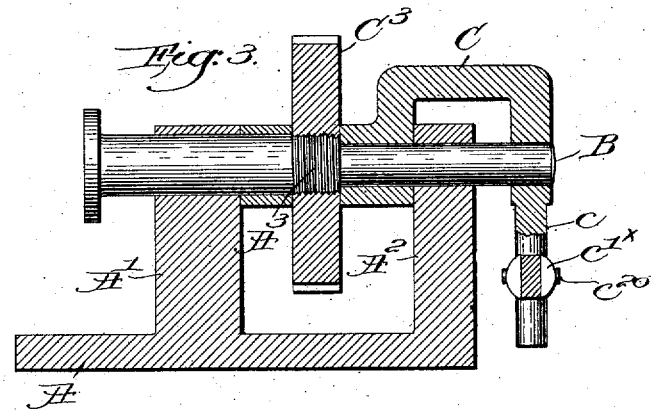
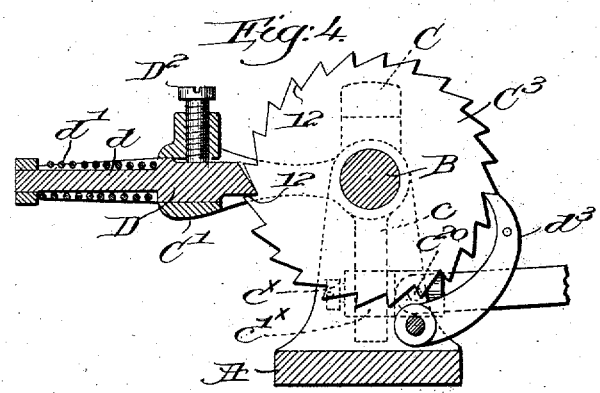
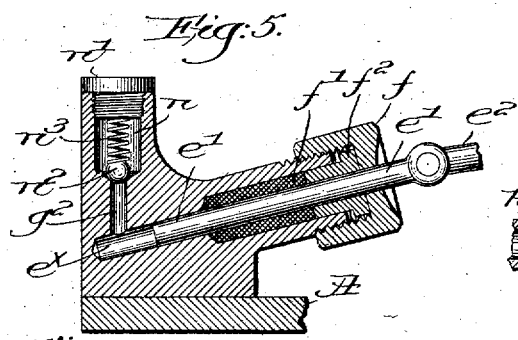
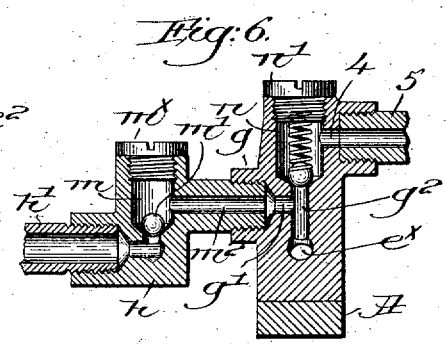

UNITED STATES PATENT OFFICE.

CHARLES F. JONES, OF NEWTON HIGHLANDS, MASSACHUSETTS.

MECHANICAL MOVEMENT.

No. 884,590.      Specification of Letters Patent.      Patented April 14, 1908.

Application filed October 20, 1906. Serial No. 339,797.

*To all whom it may concern:*

Be it known that I, CHARLES F. JONES, a citizen of the United States, residing in Newton Highlands, county of Middlesex, and State of Massachusetts, have invented an Improvement in Mechanical Movements, of which the following description, in connection with the accompanying drawing, is a specification, like letters on the drawing representing like parts.

This invention relates to a mechanical movement which has been especially designed for operating an oil pump, although its use is not necessarily limited to this purpose.

The novel features of the invention will be more fully hereinafter described and then pointed out in the claims.

In the drawings, wherein I have chosen to illustrate the invention as used for operating a pump, Figure 1 is a side elevation of a pump having my improvements applied thereto. Fig. 2 is a plan view thereof; Fig. 3 is a section in the line 3—3, Fig. 1; Fig. 4 is a section in the line 4—4, Fig. 2; Fig. 5 is a section in line 5, Fig. 2; and Fig. 6 is a section in line 6, Fig. 2.

The base A has uprights A' A² that receive the shaft B, see Fig. 3, having at one end a crank pin B' shown as a stud screw, and between its ends a threaded part A³. The shaft B sustains loosely a double yoke shaped member, one yoke being marked C and the other C', the yoke C' embracing the actuating wheel C³ shown as having at its periphery ratchet teeth, while the yoke C embraces the upright A². The double yoke has three holes in line. In assembling the parts, the wheel C³ is inserted in the yoke C' and the yoke and wheel applied to the frame so that the holes in the yoke and the wheel are in line with the holes in the uprights A', A², and then the crank shaft B is inserted as shown in Fig. 3, and the shaft is screwed into said wheel. The depending arm $c$ of the double yoke has connected therewith at the hole $c^\times$ any link or other device that in turn is connected with any moving element of any apparatus with which the device is to be used, to vibrate said yoke about said crank shaft.

To rotate the shaft B slowly, I provide the yoke C' with a sliding actuator or pawl D slidably mounted in said yoke, the acting end of the pawl being shaped to present a flat face to contact with the radial sides 12 of the teeth of the wheel C³ while the extreme end of the pawl is shaped to correspond with the inclined face of the teeth of said wheel; a pawl of such shape when engaging the teeth of the ratchet wheel substantially filling the notches and moving the wheel practically positively without any lost motion.

The pawl shown has a stem $d$ fitted to slide in a hole in the yoke C', and the stem is surrounded by a spring $d'$ that acts normally to maintain the end of the pawl in contact with the teeth of the wheel C³, the inclined end of the pawl in the back stroke of the pawl carrier sliding backwardly against the spring $d'$ due to the contact of said end with the inclined face of the teeth of the ratchet wheel. A detent $d^2$ controlled by a spring $d^4$ serves to prevent any backward rotation of the shaft B.

In the present embodiment of my invention I have shown the pawl and ratchet mechanism above described as used for operating the pump of a lubricator which is designed to force oil into the steam chest of an engine, and E is the pump cylinder which is secured to the frame A by suitable screws 2.

The pump is bored at $e$ to receive a piston $e'$ connected by link $e^2$ with the crank pin B'. The crank pin B' is shown as carried by a crank plate having a series of holes, see Fig. 1, located at different distances from the center of the shaft B so that by adjusting the crank pin, the length of stroke of the piston may be regulated and adjusted. The piston enters the pump through a cylinder head $f$, a gasket or packing $f'$ and a guide $f^2$. The side of the pump has a boss $g$ from the bottom of which, see Fig. 6, is an inlet or duct $g'$ that communicates by passage $g^2$ with the space $e^\times$ of the pump in which works the end of the piston $e'$.

The boss $g$ is threaded to be engaged by a check-box $h$, a portion of which is threaded for the reception of a pipe $h'$ that leads to the oil supply. The central part of the check box has a chamber $m$ and the lower end of the chamber is shaped to constitute a valve seat that sustains a check valve $m'$ shown as a ball, the latter being seated normally on said seat by its own weight and the back pressure of the oil in the passageway $m^2$ leading to the duct $g'$. The box at the outer end of said chamber is tapped to receive a closure or cover $m^\times$ shown as a screw. The pump at the upper end of passage $g^2$ has a chamber $n$ closed as shown by a screw cap $n'$, the chamber being shaped to constitute a valve seat for a valve $n^2$ shown as a ball acted upon by a spring $n^3$.

The shaft B is moved intermittently by the yoke and wheel $C^3$ and the crank pin is moved slowly step by step so that the piston is drawn slowly step by step from the space $e^\times$ causing the oil to enter said space, and thereafter as the piston enters the space $e^\times$ slowly the oil therein is forced through the passage $q^2$, the valve $n^2$ yielding and causing the oil to be delivered slowly from the duct 4 into the pipe 5 leading to any part of any machine that the pump shown is to furnish oil for purposes of lubrication, the part receiving the lubricant slowly. Instead of the crank pin it is obvious that an eccentric, the usual mechanical equivalent of a crank pin, may be used.

Having described my invention what I claim as new and desire to secure by Letters Patent is:—

1. In a device of the class described, the combination with an element to be reciprocated, of a shaft connected therewith, a ratchet-wheel on the shaft, a double yoke loosely sustained by the shaft, a pawl carried by one portion of the yoke and engaging said ratchet wheel, and an actuating link connected with the other portion of said yoke.

2. In a device of the class described, the combination with an element to be reciprocated, of a shaft connected therewith, two bearings $A'$, $A^2$ for the shaft, a ratchet wheel supported on said shaft between said bearings, a double yoke loosely sustained on said shaft, one portion of the yoke embracing said wheel and the other portion embracing the bearing $A^2$, a pawl carried by the first-named portion of the yoke, and an actuating link connected to the last-named portion of the yoke outside of the bearing.

3. In a device of the class described, the combination with an element to be reciprocated, of a shaft operatively connected to the piston, two bearings $A'$, $A^2$, for said shaft, said shaft projecting beyond the bearing $A^2$, a ratchet wheel fast on said shaft, a double yoke loosely sustained by said shaft, one portion of the yoke received between the bearings and embracing the ratchet wheel, and the other portion of said yoke embracing the bearing $A^2$, a spring-pressed pawl carried by the first-named portion of the yoke, an actuating member connected to the last-named portion of the yoke.

In testimony whereof, I have signed my name to this specification, in the presence of two subscribing witnesses.

CHARLES F. JONES.

Witnesses:
  GEO. W. GREGORY,
  EVANGELINE C. BROWN.